(12) United States Patent
Holden et al.

(10) Patent No.: US 7,895,378 B2
(45) Date of Patent: *Feb. 22, 2011

(54) METHOD AND SYSTEM FOR ALLOWING A MEDIA PLAYER TO TRANSFER DIGITAL AUDIO TO AN ACCESSORY

(75) Inventors: Paul Holden, Sunnyvale, CA (US); Daniel R. Fletcher, Sunnyvale, CA (US); Barry Twycross, Mountain View, CA (US); John Archibald, San Francisco, CA (US); Donald J. Novotney, San Jose, CA (US); John B. Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/476,312

(22) Filed: Jun. 27, 2006

(65) Prior Publication Data

US 2007/0233294 A1 Oct. 4, 2007

(51) Int. Cl.
*G06F 13/42* (2006.01)
(52) U.S. Cl. ........................ 710/105; 710/305; 710/306; 369/47.28; 700/94
(58) Field of Classification Search ................. 710/105, 710/305–306, 100, 61; 455/41; 369/47.28; 700/94
See application file for complete search history.

(56) References Cited

U.S. PATENT DOCUMENTS

| | | | |
|---|---|---|---|
| 4,673,861 A | 6/1987 | Dubovsky et al. | |
| 4,850,899 A | 7/1989 | Maynard | |
| 4,916,334 A | 4/1990 | Minagawa et al. | |
| 4,924,216 A | 5/1990 | Leung | |
| 4,938,483 A | 7/1990 | Yavetz | |
| 5,041,025 A | 8/1991 | Haitmanek | |
| 5,051,606 A | 9/1991 | Ikehara | |
| 5,055,069 A | 10/1991 | Townsend et al. | |

(Continued)

FOREIGN PATENT DOCUMENTS

EP 1104150 5/2001

(Continued)

OTHER PUBLICATIONS

Altec Lansing, "inMotion Users Guide," Corp. Headquarters, 535 Rte.6 & 209, Milford, PA 18337.

(Continued)

*Primary Examiner*—Thomas J Cleary
*Assistant Examiner*—Kim T Huynh
(74) *Attorney, Agent, or Firm*—Kilpatrick Townsend & Stockton LLP

(57) ABSTRACT

A method and system for allowing a media player to transfer digital audio to an accessory is disclosed. The method and system comprises sending a play command to the media player; returning information about the media player; and providing digital audio to the accessory based upon the information about the media player. In a system and method in accordance with the present invention a plurality of commands allow a media player to transfer digital audio to an accessory. These commands are used by the media player to gather a list of supported sample rates from the accessory and to inform the accessory of the media player's information.

28 Claims, 12 Drawing Sheets

U.S. PATENT DOCUMENTS

| | | |
|---|---|---|
| 5,080,603 A | 1/1992 | Mouissie |
| 5,104,243 A | 4/1992 | Harding |
| 5,108,313 A | 4/1992 | Adams |
| 5,150,031 A | 9/1992 | James et al. |
| 5,186,646 A | 2/1993 | Pederson |
| 5,247,138 A | 9/1993 | Landmeier |
| 5,277,624 A | 1/1994 | Champion |
| 5,471,128 A | 11/1995 | Patino et al. |
| 5,525,981 A | 6/1996 | Abernethy |
| 5,586,893 A | 12/1996 | Mosquera |
| 5,592,588 A | 1/1997 | Reekes et al. |
| 5,618,045 A | 4/1997 | Kagan et al. |
| 5,648,712 A | 7/1997 | Hahn |
| 5,660,558 A | 8/1997 | Osanai et al. |
| 5,727,866 A | 3/1998 | Kraines et al. |
| 5,732,361 A | 3/1998 | Liu |
| 5,754,027 A | 5/1998 | Oglesbee et al. |
| 5,830,001 A | 11/1998 | Kinoshita |
| 5,835,862 A | 11/1998 | Nykanen et al. |
| 5,845,217 A | 12/1998 | Lindell et al. |
| 5,859,522 A | 1/1999 | Theobald |
| 5,901,049 A | 5/1999 | Schmidt et al. |
| 5,964,847 A | 10/1999 | Booth et al. |
| 5,975,957 A | 11/1999 | Noda et al. |
| 6,007,372 A | 12/1999 | Wood |
| 6,012,105 A | 1/2000 | Rubbmark et al. |
| 6,031,797 A | 2/2000 | Van Ryzint et al. |
| 6,053,773 A | 4/2000 | Wu |
| 6,078,402 A | 6/2000 | Fischer et al. |
| 6,078,789 A | 6/2000 | Bodenmann et al. |
| 6,125,455 A | 9/2000 | Yeo |
| 6,130,518 A | 10/2000 | Gabehart et al. |
| 6,139,373 A | 10/2000 | Ward et al. |
| 6,154,773 A | 11/2000 | Roberts et al. |
| 6,154,798 A | 11/2000 | Lin et al. |
| 6,161,027 A | 12/2000 | Poirel |
| 6,169,387 B1 | 1/2001 | Kaib |
| 6,175,358 B1 | 1/2001 | Scott-Jackson et al. |
| 6,178,514 B1 | 1/2001 | Wood |
| 6,184,652 B1 | 2/2001 | Yang |
| 6,184,655 B1 | 2/2001 | Malackowski |
| 6,188,265 B1 | 2/2001 | Liu et al. |
| 6,203,345 B1 | 3/2001 | Roque et al. |
| 6,204,637 B1 | 3/2001 | Rengan |
| 6,206,480 B1 | 3/2001 | Thompson |
| 6,211,581 B1 | 4/2001 | Farrant |
| 6,211,649 B1 | 4/2001 | Matsuda |
| 6,224,420 B1 | 5/2001 | Nishio et al. |
| 6,230,205 B1 | 5/2001 | Garrity et al. |
| 6,234,827 B1 | 5/2001 | Nishio et al. |
| 6,236,395 B1 | 5/2001 | Sezan et al. |
| 6,252,380 B1 | 6/2001 | Koenck |
| 6,261,109 B1 | 7/2001 | Liu et al. |
| 6,262,723 B1 | 7/2001 | Matsuawa et al. |
| 6,267,623 B1 | 7/2001 | Hisamatsu |
| 6,268,845 B1 | 7/2001 | Pariza et al. |
| 6,271,605 B1 | 8/2001 | Carkner et al. |
| 6,272,328 B1 | 8/2001 | Nguyen et al. |
| 6,280,251 B1 | 8/2001 | Nishio et al. |
| 6,283,789 B1 | 9/2001 | Tsai |
| 6,304,764 B1 | 10/2001 | Pan |
| 6,314,479 B1 | 11/2001 | Frederick et al. |
| 6,316,916 B2 | 11/2001 | Bohne |
| 6,319,061 B1 | 11/2001 | Chen et al. |
| 6,322,396 B1 | 11/2001 | Kuan |
| 6,344,727 B1 | 2/2002 | Desai et al. |
| 6,353,894 B1 | 3/2002 | Pione |
| 6,354,713 B1 | 3/2002 | Leifer et al. |
| 6,358,089 B1 | 3/2002 | Kuroda et al. |
| 6,372,974 B1 | 4/2002 | Gross et al. |
| 6,385,596 B1 | 5/2002 | Wiser et al. |
| 6,394,905 B1 | 5/2002 | Takeda et al. |
| 6,429,879 B1 | 8/2002 | Sturgeon et al. |
| 6,431,915 B1 | 8/2002 | Ko |
| 6,453,371 B1 | 9/2002 | Hampson et al. |
| 6,454,592 B2 | 9/2002 | Takagi |
| 6,461,173 B1 | 10/2002 | Mizuno et al. |
| 6,464,542 B1 | 10/2002 | Lee |
| 6,468,110 B2 | 10/2002 | Fujino et al. |
| 6,476,825 B1 | 11/2002 | Croy et al. |
| 6,478,603 B1 | 11/2002 | Wu |
| 6,483,428 B1 | 11/2002 | Fish et al. |
| 6,485,328 B1 | 11/2002 | Wu |
| 6,489,751 B2 | 12/2002 | Small et al. |
| 6,501,441 B1 | 12/2002 | Ludtke et al. |
| 6,505,160 B1 | 1/2003 | Levy et al. |
| 6,524,119 B2 | 2/2003 | Kato et al. |
| 6,526,287 B1 | 2/2003 | Lee |
| 6,554,391 B1 | 4/2003 | Sharma et al. |
| 6,558,201 B1 * | 5/2003 | Begley et al. ............... 439/638 |
| 6,577,877 B1 | 6/2003 | Charlier et al. |
| 6,589,076 B1 | 7/2003 | Davis et al. |
| 6,591,085 B1 | 7/2003 | Grady |
| 6,608,264 B1 | 8/2003 | Fouladpour |
| 6,608,399 B2 | 8/2003 | McConnell et al. |
| 6,614,232 B1 | 9/2003 | Mukai |
| 6,616,473 B2 | 9/2003 | Kamata et al. |
| 6,629,197 B1 | 9/2003 | Bhogal et al. |
| 6,642,629 B2 | 11/2003 | DeLeeuw |
| 6,651,138 B2 | 11/2003 | Lai et al. |
| 6,653,813 B2 | 11/2003 | Khatri |
| 6,663,420 B1 | 12/2003 | Xiao |
| 6,665,803 B2 | 12/2003 | Lunsford et al. |
| 6,670,997 B1 | 12/2003 | Northrup |
| 6,674,995 B1 | 1/2004 | Meyers et al. |
| 6,687,454 B1 | 2/2004 | Kuroiwa |
| 6,692,100 B2 | 2/2004 | Steinfield et al. |
| 6,697,944 B1 | 2/2004 | Jones et al. |
| 6,708,283 B1 | 3/2004 | Nelvin et al. |
| 6,724,339 B2 | 4/2004 | Conway et al. |
| 6,725,061 B1 | 4/2004 | Hutchinson, IV et al. |
| 6,728,546 B1 | 4/2004 | Peterson et al. |
| 6,728,729 B1 | 4/2004 | Jawa et al. |
| 6,747,859 B2 | 6/2004 | Walbeck et al. |
| 6,754,468 B1 | 6/2004 | Sieben et al. |
| 6,761,635 B2 | 7/2004 | Hoshino et al. |
| 6,774,939 B1 | 8/2004 | Peng |
| 6,776,626 B2 | 8/2004 | Huang et al. |
| 6,776,660 B1 | 8/2004 | Kubota et al. |
| 6,776,665 B2 | 8/2004 | Huang |
| 6,799,226 B1 | 9/2004 | Robbin et al. |
| 6,801,964 B1 | 10/2004 | Mahdavi |
| 6,813,528 B1 | 11/2004 | Yang |
| 6,816,376 B2 | 11/2004 | Bright et al. |
| 6,830,160 B2 | 12/2004 | Risolia |
| 6,859,538 B1 | 2/2005 | Voltz |
| 6,859,854 B2 | 2/2005 | Kwong |
| 6,879,843 B1 | 4/2005 | Kim |
| 6,928,295 B2 | 8/2005 | Olson et al. |
| 6,931,266 B2 | 8/2005 | Miyoshi et al. |
| 6,931,456 B2 | 8/2005 | Payne et al. |
| 6,939,177 B2 | 9/2005 | Kato et al. |
| 6,944,704 B2 | 9/2005 | Brelin |
| 6,991,483 B1 | 1/2006 | Milan et al. |
| 7,004,787 B2 | 2/2006 | Milan |
| 7,013,164 B2 | 3/2006 | Lin |
| 7,040,919 B2 | 5/2006 | Yao |
| 7,050,783 B2 | 5/2006 | Curtiss et al. |
| 7,054,888 B2 | 5/2006 | LaChapelle et al. |
| 7,062,261 B2 | 6/2006 | Goldstein et al. |
| 7,108,560 B1 | 9/2006 | Chou et al. |
| 7,127,678 B2 | 10/2006 | Bhesania et al. |
| 7,127,879 B2 | 10/2006 | Zhu et al. |
| 7,155,545 B1 | 12/2006 | Wang |

| | | | | | |
|---|---|---|---|---|---|
| 7,167,112 B2 * | 1/2007 | Andersen et al. ............... 341/61 | 2004/0003300 A1 | 1/2004 | Malueg et al. |
| 7,167,935 B2 | 1/2007 | Hellberg | 2004/0019497 A1 | 1/2004 | Volk et al. |
| 7,187,947 B1 | 3/2007 | White et al. | 2004/0039860 A1 | 2/2004 | Mills et al. |
| 7,187,948 B2 | 3/2007 | Alden | 2004/0048569 A1 * | 3/2004 | Kawamura ................. 455/41.1 |
| 7,215,042 B2 | 5/2007 | Yan | 2004/0090998 A1 | 5/2004 | Chen |
| 7,281,214 B2 | 10/2007 | Fadell | 2004/0103223 A1 | 5/2004 | Gabehart et al. |
| 7,293,122 B1 | 11/2007 | Schubert et al. | 2004/0116005 A1 | 6/2004 | Choi |
| 7,293,227 B2 | 11/2007 | Plastina et al. | 2004/0162029 A1 | 8/2004 | Grady |
| 7,299,304 B2 | 11/2007 | Saint-Hilaire et al. | 2004/0164708 A1 | 8/2004 | Veselic et al. |
| 7,303,282 B2 | 12/2007 | Dwyer et al. | 2004/0172533 A1 | 9/2004 | DeMello et al. |
| 7,304,685 B2 | 12/2007 | Park et al. | 2004/0186935 A1 | 9/2004 | Bel et al. |
| 7,305,254 B2 | 12/2007 | Findikli | 2004/0194154 A1 | 9/2004 | Meadors et al. |
| 7,305,506 B1 | 12/2007 | Lydon et al. | 2004/0198436 A1 | 10/2004 | Alden |
| 7,362,963 B2 | 4/2008 | Lin | 2004/0224638 A1 | 11/2004 | Fadell et al. |
| 7,415,563 B1 | 8/2008 | Holden et al. | 2004/0235339 A1 | 11/2004 | Sato et al. |
| 7,441,058 B1 | 10/2008 | Bolton et al. | 2004/0249994 A1 | 12/2004 | Shapiro et al. |
| 7,441,062 B2 | 10/2008 | Novotney et al. | 2004/0252966 A1 | 12/2004 | Holloway et al. |
| 7,444,388 B1 | 10/2008 | Svendsen | 2004/0267812 A1 | 12/2004 | Harris et al. |
| 7,454,019 B2 | 11/2008 | Williams | 2004/0267825 A1 | 12/2004 | Novak et al. |
| 7,526,588 B1 | 4/2009 | Schubert et al. | 2004/0268397 A1 | 12/2004 | Dunbar et al. |
| 7,529,870 B1 | 5/2009 | Schubert et al. | 2005/0014119 A1 | 1/2005 | Rudakov |
| 7,529,871 B1 | 5/2009 | Schubert et al. | 2005/0014531 A1 | 1/2005 | Findikli |
| 7,529,872 B1 | 5/2009 | Schubert et al. | 2005/0014536 A1 | 1/2005 | Grady |
| 7,558,894 B1 | 7/2009 | Lydon et al. | 2005/0015355 A1 | 1/2005 | Heller et al. |
| 7,587,540 B2 | 9/2009 | Novotney et al. | 2005/0018768 A1 | 1/2005 | Mabey et al. |
| 7,590,783 B2 | 9/2009 | Lydon et al. | 2005/0022212 A1 | 1/2005 | Bowen |
| 7,610,350 B2 | 10/2009 | Abdulrahiman et al. | 2005/0047071 A1 | 3/2005 | Tse Chun Hin |
| 7,634,605 B2 | 12/2009 | Laefer et al. | 2005/0149213 A1 | 7/2005 | Guzak et al. |
| 7,660,929 B2 | 2/2010 | Novotney et al. | 2005/0181756 A1 | 8/2005 | Lin |
| 7,673,020 B2 | 3/2010 | Rosenbloom et al. | 2005/0207726 A1 | 9/2005 | Chen |
| 7,673,083 B2 | 3/2010 | Laefer et al. | 2005/0227612 A1 | 10/2005 | Helstrom et al. |
| 2001/0003205 A1 | 6/2001 | Gilbert | 2005/0239333 A1 | 10/2005 | Watanabe et al. |
| 2001/0005641 A1 | 6/2001 | Matsumoto et al. | 2005/0240705 A1 | 10/2005 | Novotney et al. |
| 2001/0006884 A1 | 7/2001 | Matsumoto | 2005/0246375 A1 | 11/2005 | Manders et al. |
| 2002/0002035 A1 | 1/2002 | Sim et al. | 2005/0281185 A1 | 12/2005 | Kawasaki |
| 2002/0010759 A1 | 1/2002 | Hitson et al. | 2006/0015826 A1 | 1/2006 | Shiozawa et al. |
| 2002/0025042 A1 | 2/2002 | Saito | 2006/0031545 A1 | 2/2006 | Manders et al. |
| 2002/0029303 A1 | 3/2002 | Nguyen | 2006/0056796 A1 | 3/2006 | Nishizawa et al. |
| 2002/0065074 A1 | 5/2002 | Cohn et al. | 2006/0088228 A1 | 4/2006 | Marriott et al. |
| 2002/0068610 A1 | 6/2002 | Anvekar et al. | 2006/0116009 A1 | 6/2006 | Langberg et al. |
| 2002/0072390 A1 | 6/2002 | Uchiyama | 2006/0143680 A1 | 6/2006 | Adachi |
| 2002/0103008 A1 | 8/2002 | Rahn et al. | 2006/0156415 A1 | 7/2006 | Rubinstein et al. |
| 2002/0105861 A1 | 8/2002 | Leapman | 2006/0161621 A1 | 7/2006 | Rosenberg |
| 2002/0108108 A1 | 8/2002 | Akaiwa et al. | 2006/0163358 A1 * | 7/2006 | Biderman ............... 235/472.01 |
| 2002/0115480 A1 | 8/2002 | Huang | 2006/0184456 A1 | 8/2006 | de Janasz |
| 2002/0116533 A1 | 8/2002 | Holliman et al. | 2006/0188237 A1 | 8/2006 | Watanabe et al. |
| 2002/0132651 A1 | 9/2002 | Jinnouchi | 2006/0224620 A1 | 10/2006 | Silverman et al. |
| 2002/0151327 A1 | 10/2002 | Levitt | 2006/0236245 A1 | 10/2006 | Agarwal et al. |
| 2002/0152874 A1 | 10/2002 | Vilcauskas et al. | 2006/0247851 A1 | 11/2006 | Morris |
| 2002/0156546 A1 | 10/2002 | Ramaswamy | 2006/0258289 A1 | 11/2006 | Dua |
| 2002/0156949 A1 | 10/2002 | Kubo et al. | 2006/0294209 A1 | 12/2006 | Rosenbloom et al. |
| 2002/0173273 A1 | 11/2002 | Spurgat et al. | 2007/0018947 A1 | 1/2007 | Toro-Lira |
| 2002/0174269 A1 * | 11/2002 | Spurgat et al. ................. 710/1 | 2007/0056012 A1 * | 3/2007 | Kwon et al. ................. 725/133 |
| 2002/0194621 A1 | 12/2002 | Tran et al. | 2007/0056013 A1 | 3/2007 | Duncan |
| 2003/0004934 A1 | 1/2003 | Qian | 2007/0070856 A1 | 3/2007 | Tebele |
| 2003/0011608 A1 | 1/2003 | Wada | 2007/0080823 A1 | 4/2007 | Fu et al. |
| 2003/0028664 A1 | 2/2003 | Tan et al. | 2007/0083750 A1 | 4/2007 | Miura et al. |
| 2003/0041206 A1 | 2/2003 | Dickie | 2007/0083814 A1 | 4/2007 | Wilbrink et al. |
| 2003/0059022 A1 | 3/2003 | Nebiker et al. | 2007/0086724 A1 | 4/2007 | Grady et al. |
| 2003/0067741 A1 | 4/2003 | Alfonso et al. | 2007/0106760 A1 | 5/2007 | Houh et al. |
| 2003/0073432 A1 | 4/2003 | Meade | 2007/0130592 A1 | 6/2007 | Haeusel |
| 2003/0079038 A1 | 4/2003 | Robbin et al. | 2007/0173197 A1 | 7/2007 | Hsiung |
| 2003/0090998 A1 | 5/2003 | Lee et al. | 2007/0173294 A1 | 7/2007 | Hsiung |
| 2003/0097379 A1 | 5/2003 | Ireton | 2007/0206827 A1 | 9/2007 | Tupman et al. |
| 2003/0110403 A1 | 6/2003 | Crutchfield et al. | 2007/0226238 A1 | 9/2007 | Kiilerich et al. |
| 2003/0151621 A1 | 8/2003 | McEvilly et al. | 2007/0226384 A1 * | 9/2007 | Robbin et al. ................. 710/61 |
| 2003/0167318 A1 | 9/2003 | Robbin et al. | 2007/0233295 A1 | 10/2007 | Laefer et al. |
| 2003/0172209 A1 | 9/2003 | Liu et al. | 2007/0234420 A1 | 10/2007 | Novotney et al. |
| 2003/0185395 A1 | 10/2003 | Lee et al. | 2007/0236482 A1 | 10/2007 | Proctor et al. |
| 2003/0198015 A1 | 10/2003 | Vogt | 2007/0247794 A1 | 10/2007 | Jaffe et al. |
| 2003/0220988 A1 | 11/2003 | Hymel | 2007/0300155 A1 | 12/2007 | Laefer et al. |
| 2003/0236075 A1 | 12/2003 | Johnson et al. | 2008/0025172 A1 | 1/2008 | Holden et al. |
| 2003/0237043 A1 | 12/2003 | Novak et al. | 2008/0034325 A1 | 2/2008 | Ording |

| | | | |
|---|---|---|---|
| 2008/0055272 | A1 | 3/2008 | Anzures et al. |
| 2008/0065722 | A1 | 3/2008 | Brodersen et al. |
| 2009/0013096 | A1 | 1/2009 | Novotney et al. |
| 2009/0013110 | A1 | 1/2009 | Novotney et al. |
| 2009/0013253 | A1 | 1/2009 | Laefer et al. |
| 2009/0125134 | A1 | 5/2009 | Bolton et al. |
| 2009/0132076 | A1 | 5/2009 | Holden et al. |
| 2009/0198361 | A1 | 8/2009 | Schubert et al. |
| 2009/0204244 | A1 | 8/2009 | Schubert et al. |
| 2009/0204738 | A1 | 8/2009 | Schubert et al. |
| 2009/0210079 | A1 | 8/2009 | Schubert et al. |
| 2009/0249101 | A1 | 10/2009 | Lydon et al. |
| 2009/0292835 | A1 | 11/2009 | Novotney et al. |
| 2009/0299506 | A1 | 12/2009 | Lydon et al. |
| 2010/0106879 | A1 | 4/2010 | Laefer et al. |

FOREIGN PATENT DOCUMENTS

| | | | |
|---|---|---|---|
| EP | 1150472 | A2 | 10/2001 |
| EP | 1367734 | A1 | 3/2003 |
| EP | 1498899 | A | 1/2005 |
| EP | 1594319 | A | 11/2005 |
| EP | 1672613 | A | 6/2006 |
| GB | 2405718 | A | 3/2005 |
| JP | 3090747 | U | 9/1991 |
| JP | 03-224738 | | 10/1991 |
| JP | 07-176351 | | 7/1995 |
| JP | 10-321302 | | 4/1998 |
| JP | 10-334993 | | 12/1998 |
| JP | 11-288420 | | 10/1999 |
| JP | 2000-214953 | | 8/2000 |
| JP | 2000-223215 | | 8/2000 |
| JP | 2000-223216 | | 8/2000 |
| JP | 2000-223218 | | 8/2000 |
| JP | 2001-035603 | | 2/2001 |
| JP | 2001-069165 | A | 3/2001 |
| JP | 2001-171135 | | 6/2001 |
| JP | 2001-196133 | | 7/2001 |
| JP | 2001-230021 | | 8/2001 |
| JP | 2001-277526 | | 10/2001 |
| JP | 2001-332350 | | 11/2001 |
| JP | 2002-025720 | | 1/2002 |
| JP | 2002-14304 | A | 5/2002 |
| JP | 2002-203641 | | 7/2002 |
| JP | 2002 245719 | | 8/2002 |
| JP | 2002-252566 | | 9/2002 |
| JP | 2002-374447 | | 12/2002 |
| JP | 2003-17165 | | 1/2003 |
| JP | 2003-032351 | | 1/2003 |
| JP | 2003-058430 | A | 2/2003 |
| JP | 2003-274386 | | 9/2003 |
| JP | 2002-342659 | | 11/2003 |
| JP | 2004-078538 | A | 3/2004 |
| JP | 2004-259280 | A | 9/2004 |
| JP | 2008053955 | A | 3/2008 |
| JP | 2008071419 | A | 3/2008 |
| JP | 2009303001 | A | 12/2009 |
| WO | WO 99/26330 | | 5/1999 |
| WO | WO 03056776 | A1 | 9/1999 |
| WO | WO 00/39907 | | 7/2000 |
| WO | WO 00/60450 | | 10/2000 |
| WO | WO 02/49314 | | 6/2002 |
| WO | WO 03/036541 | A1 | 5/2003 |
| WO | WO 03/036957 | A1 | 5/2003 |
| WO | WO 9948089 | A2 | 7/2003 |
| WO | WO 03/073688 | | 9/2003 |
| WO | WO 2004/084413 | | 9/2004 |
| WO | WO 2004/095772 | A1 | 11/2004 |
| WO | WO 2004/112311 | A1 | 12/2004 |
| WO | WO 2005/119463 | A | 12/2005 |
| WO | WO 2006/080957 | A1 | 8/2006 |

OTHER PUBLICATIONS

"ipodDock/iPod Cradle,"www.bookendzdocks.com/dock_cradle.htm, downloaded Feb. 27, 2003.

"Making USB Work", downloaded Oct. 16, 2001, PC Magazine: PC Tech wysiwvcl:/_15_5/http://www.zdnet.com/pcmag/pctech/content!18/04/tu_1804.001.html.

"Neuros MP3 Digital Audio Computer," www.neurosaudio.com, downloaded Apr. 9, 2003.

"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.httml.

Anonymous: "Future of Digital Music in Windows,"Microsoft Windows Hardware Developer Central Archive, [Online] Dec. 4, 2001 URL:http://www.microsoft.com/whdc/archive/digitaudio.mspx> [retrieved on Jan. 15, 2008].

Anonymous: "Introduction to Digital Audio," Microsoft Windows Hardware Developer Central Archive, [online] Dec. 4, 2001 URL:http://www.microsoft.com/whdc/archive/digitaudio.mspx> [retrieved on Jan. 15, 2008].

Anonymous; "Windows and Red Book Audio" Microsoft Windows Hardware Developer Central Archive, [Online] Dec. 4, 2001 URL:http://www.microsoft.com/whdc/archive/Dmfuture.mspx> [retrieved Jan. 15, 2008].

Belkin, iPod Voice Recorder, Product Specification Sheet, printed Jun. 16, 2004.

Bindra, "Standard Turns Monitor into I/O Hub," *Electronic Engineering Times*, vol. 918, Sep. 6, 1996, p. 14.

Brentrup, "Introduction to Public Key Cryptography Demystified," Campus Technology, printed from http://www.campus-technology.com/article.asp?id=7626 on Oct. 6, 2004.

"Cables to Go," download Oct. 16, 2001 http://www.cablestogo.com/product.asp?cat%5Fid=601&sku=27028.

Crawford et al., "Sample rate conversion and bit rate reduction in the studio," IEE Colloquim on Digital Audio Signal Processing, May 22, 1991, pp. 8-1.

"ExpressBus™ FUOI 0 User Guide Packing Checklist", Belkin Components.

"FireWire", downloaded Oct. 16, 2001, si_wyg:/_/4_2/http://developer.apple.com|hardware|Fire_Wire.

"Fire Wire Connector", downloaded Oct. 16, 2001, wysiwyg:/176/http://developer.apple.com/...es/Macintosh_CPUs_G3/iBook/iBook-27.html.

Fried, "FireWire poised to become ubiquitous", downloaded Oct. 16, 2001, CNET News.com, 1394 Trade Association: Press, wysiwyq:/132/http:/_113_94ta.org/Press/200_1Press/august!8.2_7._b.html.

Fried, "New Fire Wire to blaze faster trail", downloaded Oct. 16, 2001, CNET News.com, http://news.cnet.com/news/0/I006-200-6021210.html.

"How to Connect Your Computer, PC Hardware", downloaded Oct. 16, 2001, http:///www.scar.utoronto.ca!>ccweb/faculty/connect-howto.html.

"IEEE 1394/USB Comparison", downloaded Oct. 16, 2001, www.genitech.com.au|LIBRARY/TechSupportiinfobits/firewirevsusb.htm.

Lambert, "Digital Audio Interfaces," Journal of the Audio Engineering Society, Audio Engineering Society, New York, NY vol. 38, No. 9, (Sep. 1, 1990), pp. 681-684, 686, 68 XP000175146 ISSN: 1549-4950 figures 9, 10.

Lewis, Peter, "On Technology." *Fortune Magazine*, Dec. 9, 2002.

"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document.

"PMC FW2 IEEE1394 FireWire Controller", downloaded Oct. 16, 2001, http://www.bvmltd.co.uk/PMCfw2ds.html.

Severance, "FireWire Finally Comes Home", Standards, Michigan State University, Nov. 1998, pp. 117-118.

Sinitsyn, Alexander, "Synchronization Framework for Personal Mobile Servers," *Pervasive Computing and Communications Workshops (PERCOMW'04)*, Proceedings of the Second IEEE Annual Conference, Piscataway, NJ, USA, IEEE, Mar. 14, 2004, pp. 208-212.

"The Authoritative Dictionary of IEEE Standards Terms, Seventh Edition", Pbulished by Standards Information Network, IEEE Press.

Vitaliano, "Why FireWire is Hot!Hot!Hot!", downloaded Oct. 16, 2001, "Impact.Fire Wire.SideBar" http://www.vxm.com/21R.35.html.

International Search Report PCT/US2007/072154.

iPod Classic User's Guide, acquired from apple.com, 2002; 44 pages.

iPod nano Features Guide, acquired from apple.com, 2008; 72 pages.

ipod touch User's Guide, acquired from apple.com, 2008, 120 pages.

Microsoft, "Media Transport Protocol Implementation Details," 2005, 18 pages.

"Universal Serial Bus Specification—Rev 2.0," Chapter 6, Compaq Hewlett-Packard, Apr. 27, 2000, pp. 85, 99-100.

"Universal Serial Bus Specification—Rev 2.0," XP002474828, Chapter 9, USB Device Framework, pp. 239-274.

MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. 2 pages.

MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

U.S. Appl. No. 12/610,966, filed Nov. 2, 2009, Laefer et al.

Chen et al., "Design and Implemeation of a Hard Disk-Based Entertainment Device for Managing Media Contents on the Go," Consumer Electonics, 1005. (ISCE 2005). Proceedings of the Ninth International Symposium on, pp. 328-333, Jun. 14-16, 2005.

LSI Logic's Broadcast PC Card Brings New Multimedia Capabilities to Personal Computing. (Nov. 16). PR Newswire, 1. Retrieved Jun. 26, 2010, from Business Dateline.

Slay et al., "iPod Forensics: Forencically Sound Examination of an Apple iPod," System Sciences, 2007. HICSS 2007. 40th Annual Hawaii Internation Conference on, pp. 1-9, Jan. 2007.

* cited by examiner 3.1 CONNECTOR PIN DESIGNATIONS:
3.1.1 OMNI: JAE DDI 30 pin connector series

| Pin | Signal name | I/O | Function |
|---|---|---|---|
| 1 | DGND | I | Digital Ground |
| 2 | DGND | I | Digital Ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | O | 3.3V output from iPod. Current limited to 100mA. |
| 14 | Reserved | | |
| 15 | DGND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | S video Y | O | Luminance Component |
| 22 | S video C | O | Chrominance Component |
| 23 | Video Composite | O | Composite Signal |
| 24 | Remote Sense | I | Detect Remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Singal, never to be grounded inside accessory |
| 30 | DGND | GND | Digital ground iPod |
| 31 | Chassis | | Chassis ground for connector shell |
| 32 | Chassis | | Chassis ground for connector shell |

FIG.3A 3.1.2 AUDIO/REMOTE: 8 pin Foxconn Apple Custom

| Pin | Signal name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG.3B

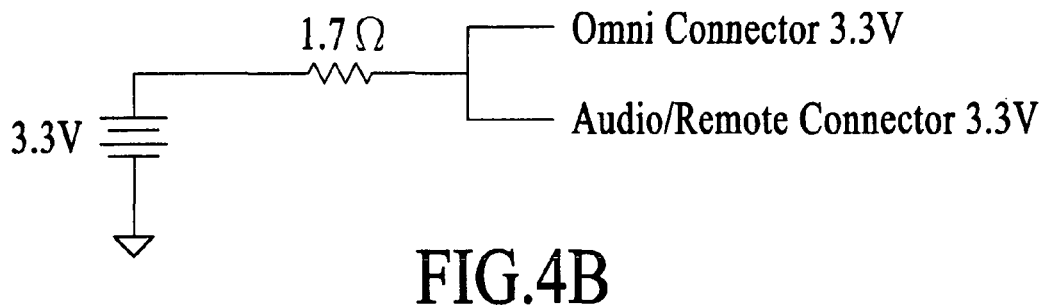

FIG.4B

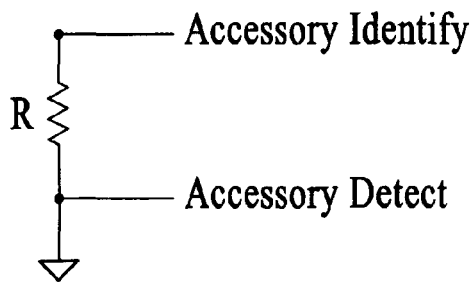

FIG.4C

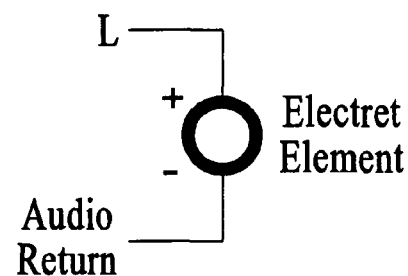

FIG.4D

| Decimal Sample Rate (Hz) | Hex Sample Rate (Hz) |
| --- | --- |
| 8,000 | 0x00001F40 |
| 11,025 | 0x00002B11 |
| 12,000 | 0x00002EE0 |
| 16,000 | 0x00003E80 |
| 22,050 | 0x00005622 |
| 24,000 | 0x00005DC0 |
| 32,000* | 0x00007D00* |
| 44,100* | 0x0000AC44* |
| 48,000* | 0x0000BB80* |

Fig. 7

METHOD AND SYSTEM FOR ALLOWING A MEDIA PLAYER TO TRANSFER DIGITAL AUDIO TO AN ACCESSORY

FIELD OF THE INVENTION

The present invention relates generally to electrical devices and more particularly to electrical devices such as media players that communicate with accessory device.

BACKGROUND OF THE INVENTION

A media player stores media assets, such as audio tracks, videos, and photos that can be played or displayed on the media player. One example of a media player is the iPod™ media player, which is available from Apple Inc. of Cupertino, Calif. Often, a media player acquires its media assets from a host computer that serves to enable a user to manage media assets. As an example, the host computer can execute a media management application to manage media assets. One example of a media management application is iTunes®, version 6.0, produced by Apple Inc.

A media player typically includes one or more connectors or ports that can be used to interface to the media player. For example, the connector or port can enable the media player to couple to a host computer, be inserted into a docking system, or receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile.

Many accessories, such as USB speakers, are capable of receiving digital audio. Accordingly, it is desirable that the media player be able to provide digital audio to these types of accessories. Heretofore, only analog audio signals have been provided from the media player to an accessory.

Thus, there is a need for improved techniques to enable manufacturers of media players to provide digital audio tracks to associated accessories. The present invention addresses such a need.

SUMMARY OF THE INVENTION

A method and system for allowing a media player to transfer digital audio to an accessory is disclosed. The method and system comprises sending a play command to the media player; returning information about the media player; and providing digital audio to the accessory based upon the information about the media player.

In a system and method in accordance with the present invention a plurality of commands allow a media player to transfer digital audio to an accessory. These commands are used by the media player to gather a list of supported sample rates from the accessory and to inform the accessory of the media player's information.

BRIEF DESCRIPTION OF THE DRAWINGS

FIG. 3A illustrates connector pin designations for the docking connector.

FIG. 3B illustrates connection pin designations for the remote connector.

FIG. 4B illustrates a reference schematic diagram for an accessory power source.

FIG. 4C illustrates a reference schematic diagram for a system for detecting and identifying accessories for the docking connector.

FIG. 4D is a reference schematic of an electret microphone that may be connected to the remote connector.

FIG. 7 is a table that lists examples of the media player supported sample rates.

DETAILED DESCRIPTION OF THE INVENTION

The present invention relates generally to electrical devices and more particularly to electrical devices such as media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a system and method in accordance with the present invention a plurality of commands allow a media player to transfer digital audio to an accessory. The method and system comprise sending a play command to the media player; returning information about the media player; and providing digital audio to the accessory based upon the information about the media player. The media player may perform sample rate conversion internally to transfer digital audio at a supported sample rate. The plurality of commands could be utilized in a variety of environments. One such environment is within a connector interface system environment such as described in detail hereinbelow.

Connector Interface System Overview

To describe the features of the connector interface system in accordance with the present invention in more detail, refer now to the following description in conjunction with the accompanying drawings.

Docking Connector

Figure 1A:
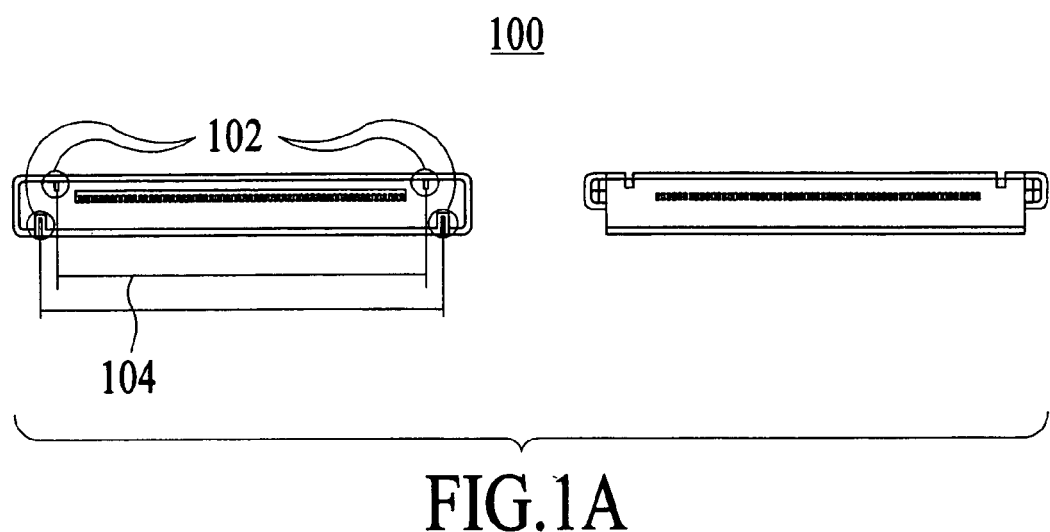
FIGS. 1A and 1B illustrate a docking connector in accordance with the present invention.
Figure 1B:
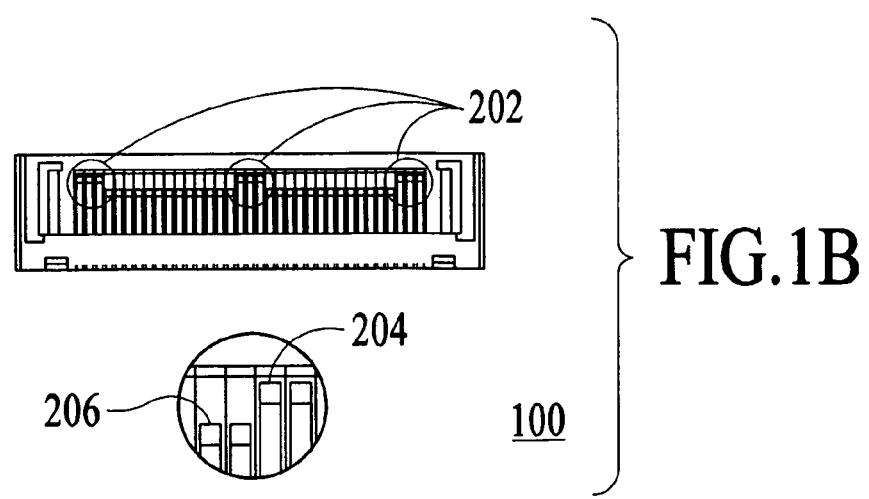

FIGS. 1A and 1B illustrate a docking connector 100 in accordance with the present invention. Referring first to FIG. 1 A, the keying features 102 are of a custom length 104. In addition, a specific key arrangement where one set of keys are separated by one length are at the bottom and another set of keys are separated by another length at the top of the connector is used. The use of this key arrangement prevents noncompliant connectors from being plugged in and causing potential damage to the device. The connector for power utilizes a Firewire or USB specification for power. The connector includes a first make/last break contact to implement this scheme. FIG. 1B illustrates the first make/last break contact 202 and also illustrates a ground pin and a power pin related to providing an appropriate first make/last break contact. In this example, the ground pin 204 is longer than the power pin 206. Therefore, the ground pin 204 would contact its mating pin in the docking accessory before the power pin 206. Therefore internal electrical damage of the electronics of the device is minimized.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the media player.

Remote Connector

Figure 2A:
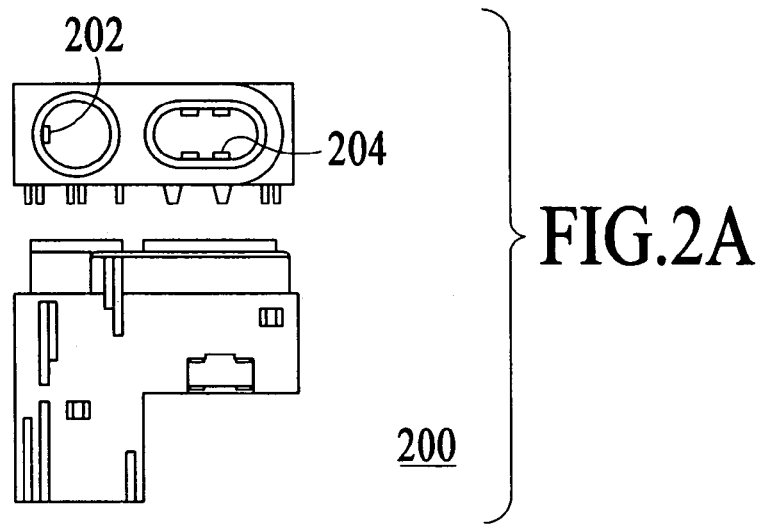
FIG. 2A is a front and top view of a remote connector in accordance with the present invention.
Figure 2B:
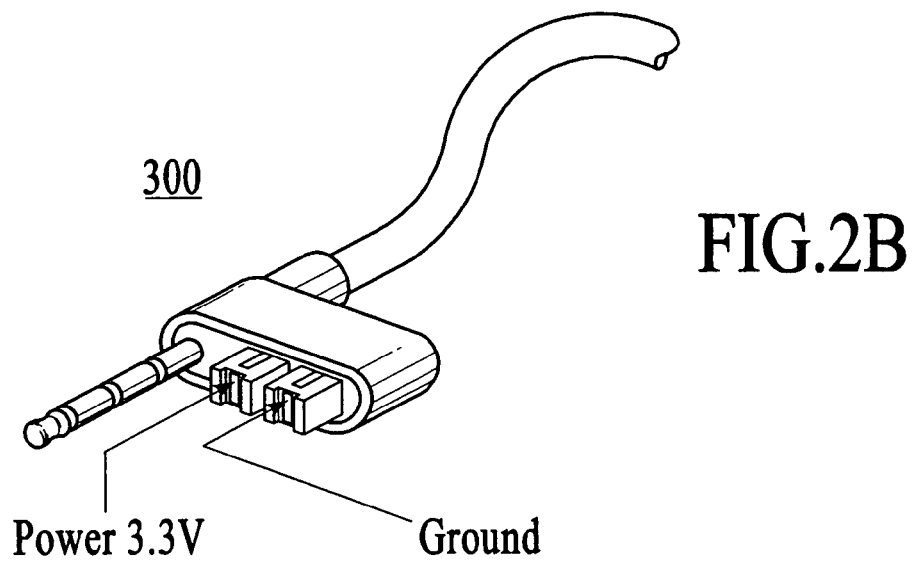
FIG. 2B illustrates a plug to be utilized in the remote connector of FIG. 2A.
Figure 2C:
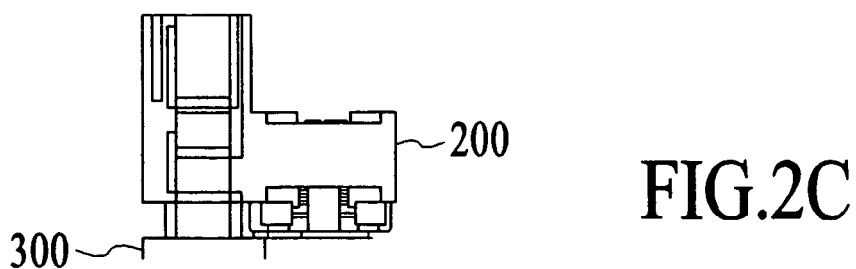
FIG. 2C illustrates the plug of FIG. 2B inserted into the remote connector of FIG. 2A.

The connector interface system also includes a remote connector which provides for the ability to output and input audio, to provide I/O serial protocol, and to provide an output for video. FIG. 2A is a front and top view of a remote connector 200 in accordance with the present invention. As is seen, the remote connector 200 includes a top headphone receptacle 202, as well as a second receptacle 204 for remote devices. FIG. 2B illustrates a plug 300 to be utilized in the remote connector. The plug 300 allows the features to be provided via the remote connector. FIG. 2C illustrates the plug 300 inserted into the remote connector 200. Heretofore, all these features have not been implemented in a remote connector. Therefore, a standard headphone cable can be plugged in but also special remote control cables, microphone cables and video cables could be utilized with the remote connector.

To describe the features of the connector interface system in more detail, please find below a functional description of the docking connector, remote connector and a command set in accordance with the present invention.

Docking and Remote Connector Specifications

For an example of the connector pin designations for both the docking connector and for the remote connector for a media player such as an iPod™ device by Apple Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
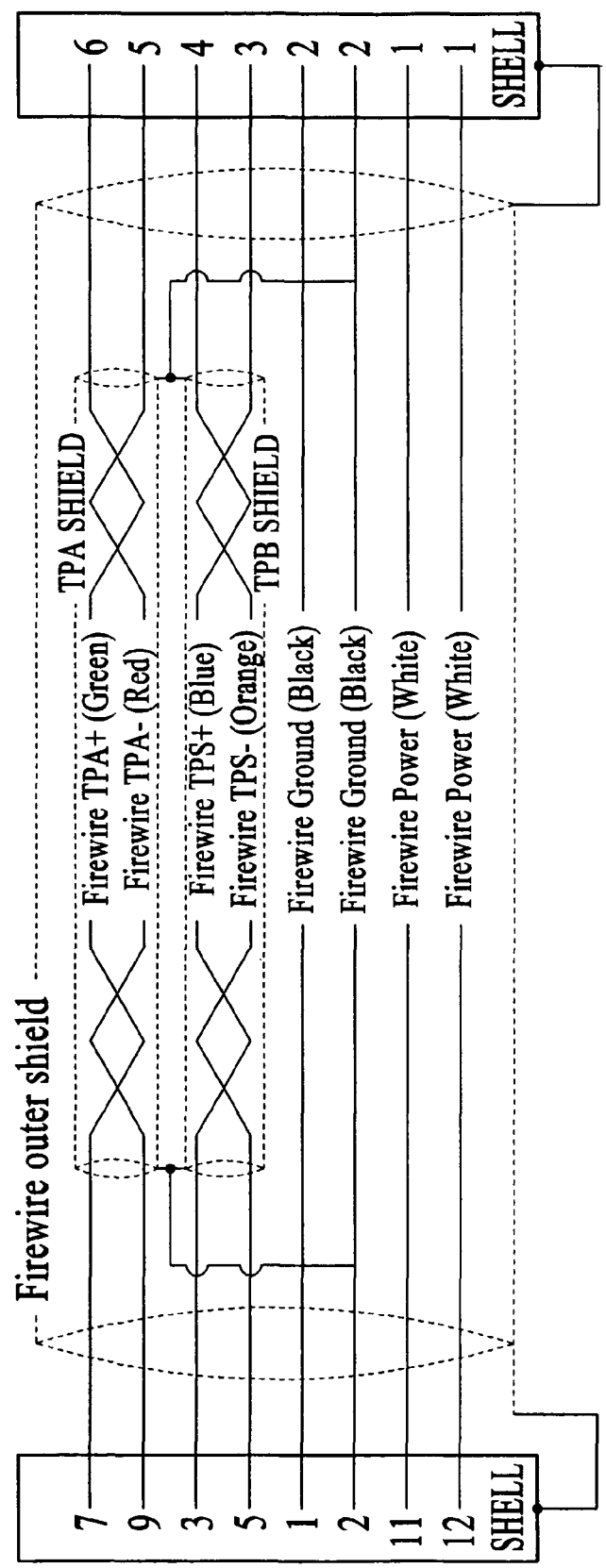
FIG. 4A illustrates a typical FireWire connector interface for the docking connector.

FIG. 4A illustrates a typical Firewire connector interface for the docking connector. The following specifications are provided:

Firewire Power: 8V-30V DC IN, 10 W max. Firewire is designed to IEEE 1394 A Spec (400 Mb/s).

USB Interface

The media player provides two configurations, or modes, of USB device operation: mass storage and media player USB Interface (MPUI). The MPUI allows the media player to be controlled using a media player accessory protocol (MPAP) which will be described in detail later herein, using a USB Human Interface Device (HID) interface as a transport mechanism.

Accessory 3.3 V Power

FIG. 4B illustrates the accessory power source. The media player accessory power pin supplies voltages, for example, 3.0 V to 3.3V+/−5% (2.85 V to 3.465 V) over the 30-pin docking connector and remote connector (if present). A maximum current is shared between the 30-pin docking and remote connectors.

By default, the media player supplies a particular current such as 5 mA. Proper software accessory detect is required to turn on high power (for example, up to 100 mA) during active device usage. When devices are inactive, they must consume less than a predetermined amount of power such as 5 mA current.

Accessory power is switched off for a period of, for example, approximately 2 seconds during the media player bootstrap process. This is done to ensure that accessories are in a known state and can be properly detected. All accessories are responsible for re-identifying themselves after the media player completes the bootstrap process and transitions accessory power from the off to the on state.

Accessory power is grounded through the DGND pins.

FIG. 4C illustrates a reference schematic diagram for a system for detecting and identifying accessories for the docking connector. The system comprises a resistor to ground that allows the device to determine what has been plugged into the docking connector. There is an internal pullup on Accessory Identify within the media player. Two pins (Accessory Identify & Accessory Detect) are required.

FIG. 4D is a reference schematic of an electret microphone that is within the remote connector.

Serial Protocol Communication is provided by two pins used to communicate to and from device (Rx & Tx). Input & Output levels are 0 V=Low, 3.3V=High.

Figure 5A:
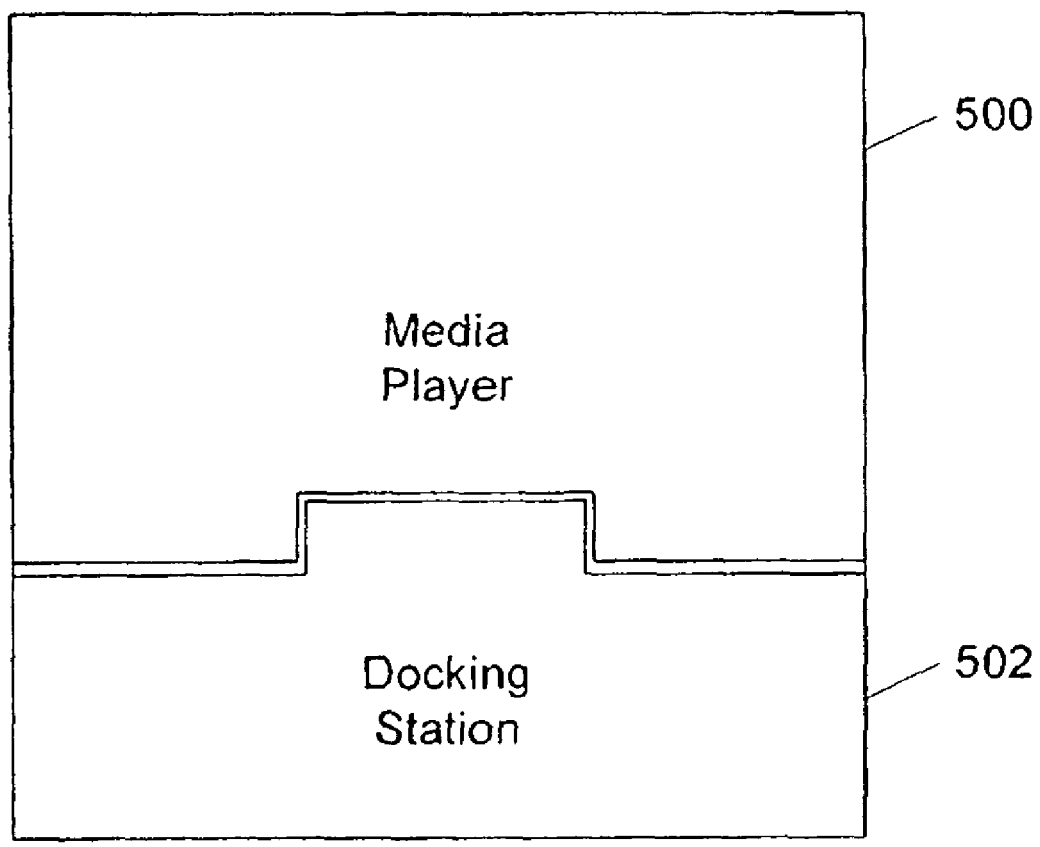
FIG. 5A illustrates a media player coupled to different accessories.
Figure 5B:
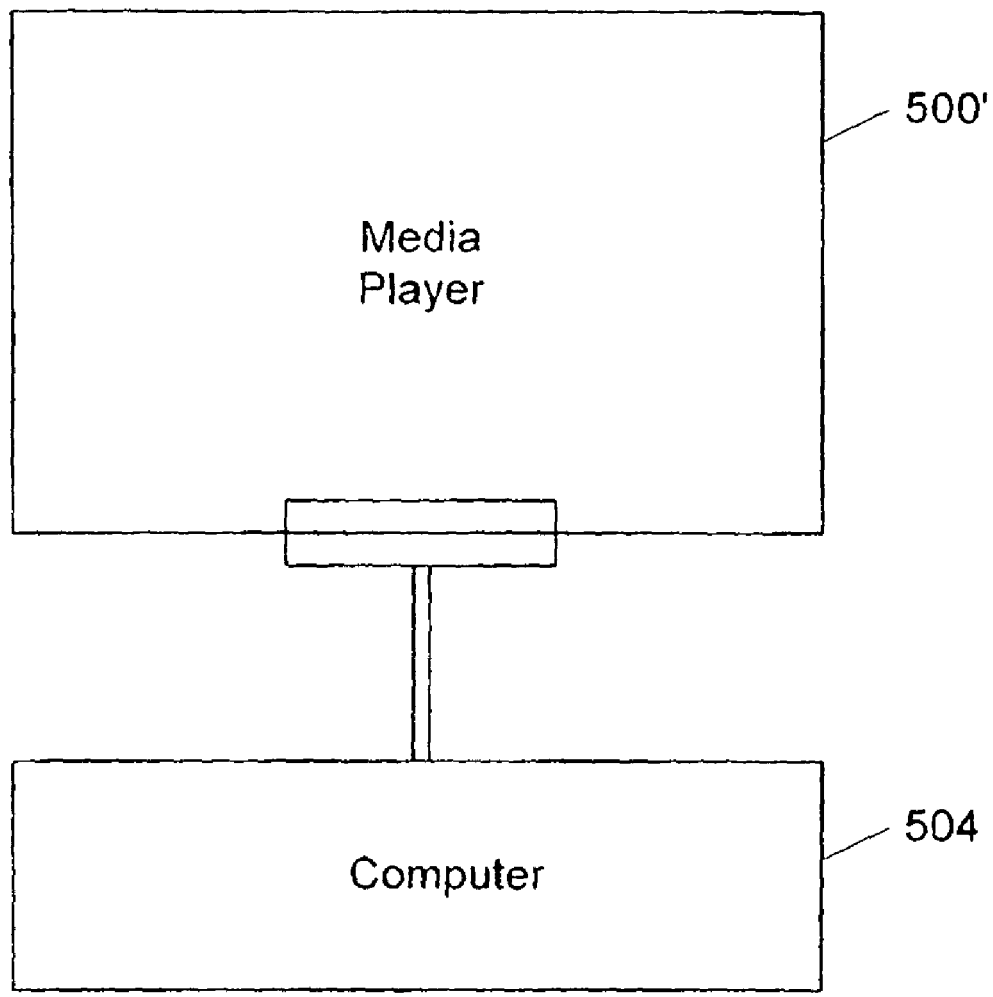
FIG. 5B illustrates the media player coupled to a computer.
Figure 5C:
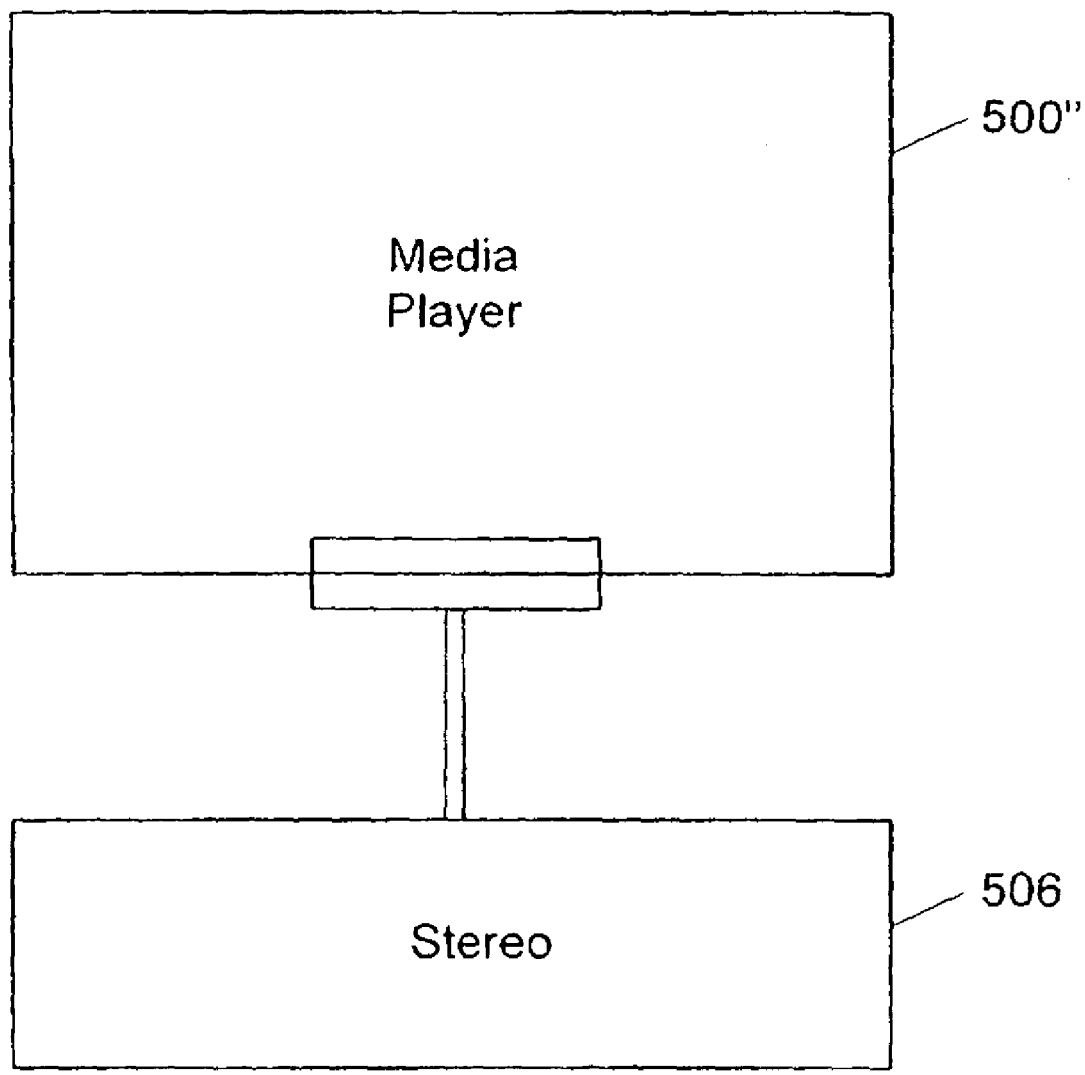
FIG. 5C illustrates the media player coupled to a car or home stereo system.
Figure 5D:
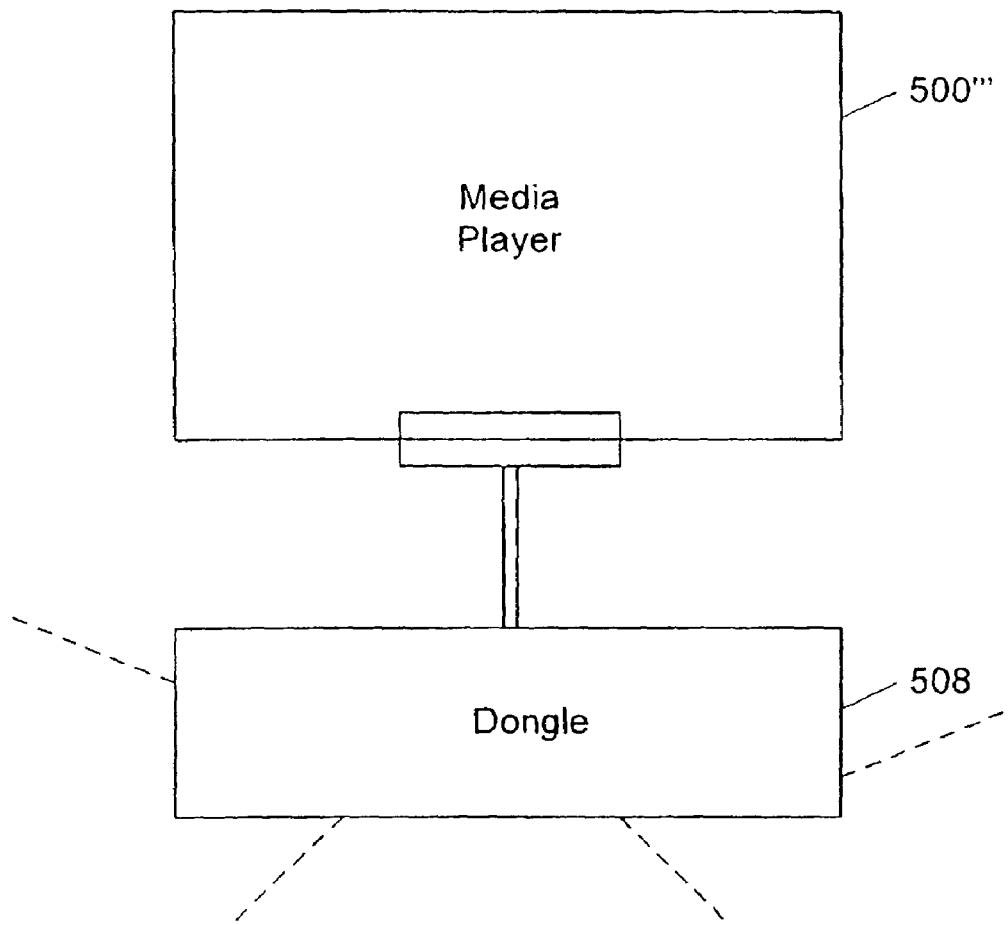
FIG. 5D illustrates the media player coupled to a dongle that communicates wirelessly with other accessories.
Figure 5E:
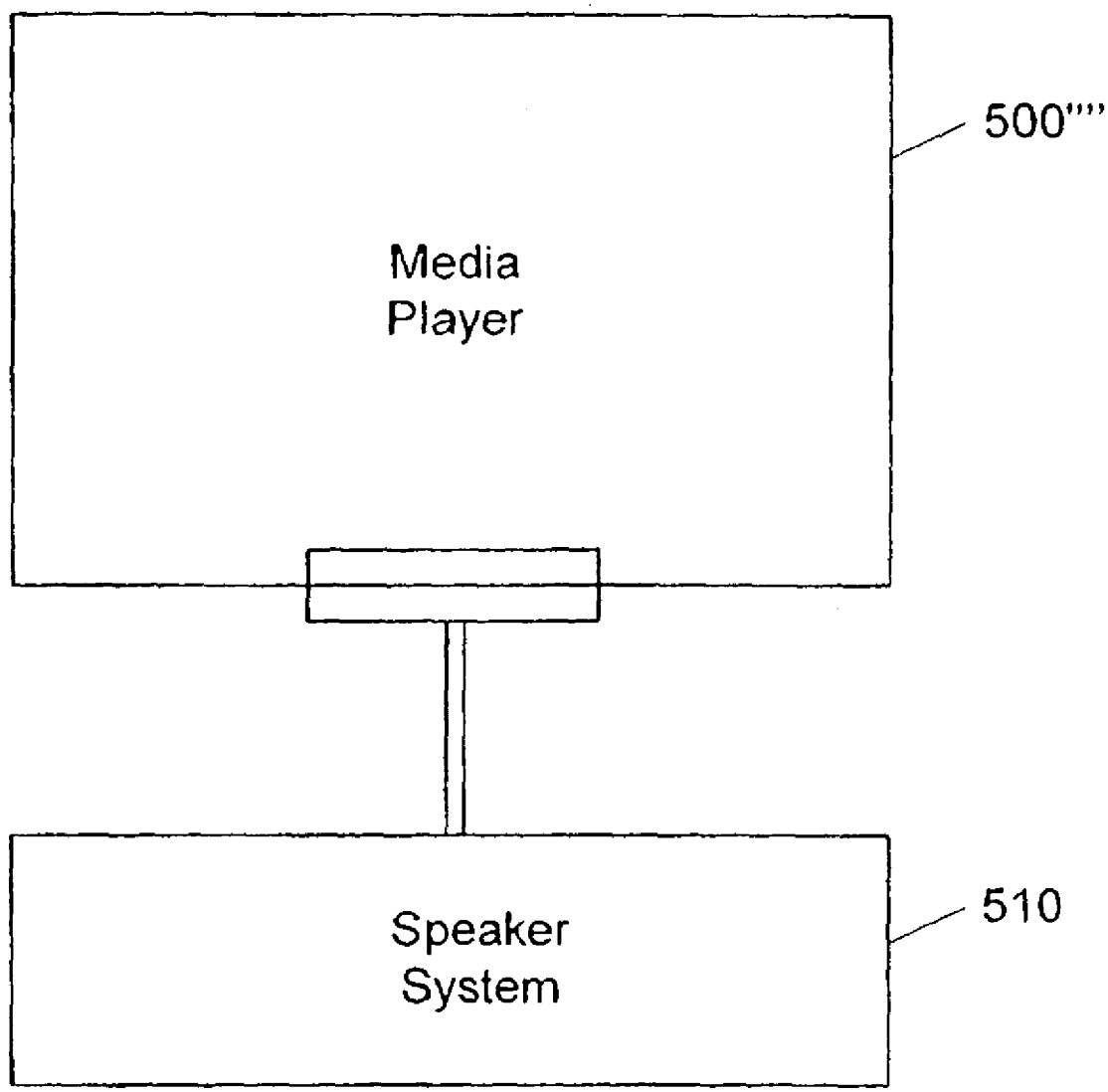
FIG. 5E illustrates the media player coupled to a speaker system.

As before mentioned, media players connect to a variety of accessories. FIGS. 5A-5E illustrates a media player 500 coupled to different accessories. FIG. 5A illustrates a media player 500' coupled to a docking station 502. FIG. 5B illustrates the media player 500" coupled to a computer 504. FIG. 5C illustrates the media player 500'" coupled to a car or home stereo system 506. FIG. 5D illustrates the media player 500"" coupled to a dongle 508 that communicates wirelessly with other devices. FIG. 5E illustrates the media player 500""' coupled to a speaker system 510. As is seen, what is meant by accessories includes but is not limited to docking stations, chargers, car stereos, microphones, home stereos, computers, speakers, and accessories which communicate wirelessly with other accessories.

As before mentioned, this connector interface system could be utilized with a command set for allowing the transfer of digital audio from a media player to an associated accessory. In the USB environment, the transfer is performed by streaming the digital audio to the accessory. It should be understood by one of ordinary skill in the art that although the above-identified connector interface system could be utilized with the command set a variety of other connectors or systems could be utilized and they would be within the spirit and scope of the present invention. To describe the utilization of a digital audio command set in more detail refer now to the following description in conjunction with the accompanying drawings.

The command set allows the media player to transfer digital audio to an accessory. These commands are used by the media player to gather a list of supported sample rates from the accessory and to inform the accessory of the media player's information such as current sample rate, sound check value, and track volume adjustment value. The media player may perform sample rate conversion internally to transfer digital audio at a supported sample rate.

Typical Transactions for Digital Audio

Under normal circumstances, the media player and the accessory requesting digital audio over USB audio will perform the following steps:

1. User connects the media player to the accessory using the connector interface system 100 to a USB cable.

2. Media player provides a plurality of configurations to the accessory, for example, mass storage and USB audio.

3. The accessory selects the USB audio configuration using an USB standard request.

The accessory may authenticate with the media player before digital audio is enabled. When the accessory identifies as one supporting digital audio signal, authentication can be provided and the media player can proceed immediately as if the process was successful. If the authentication process fails, digital audio on the media player will be disabled immediately.

Figure 6:
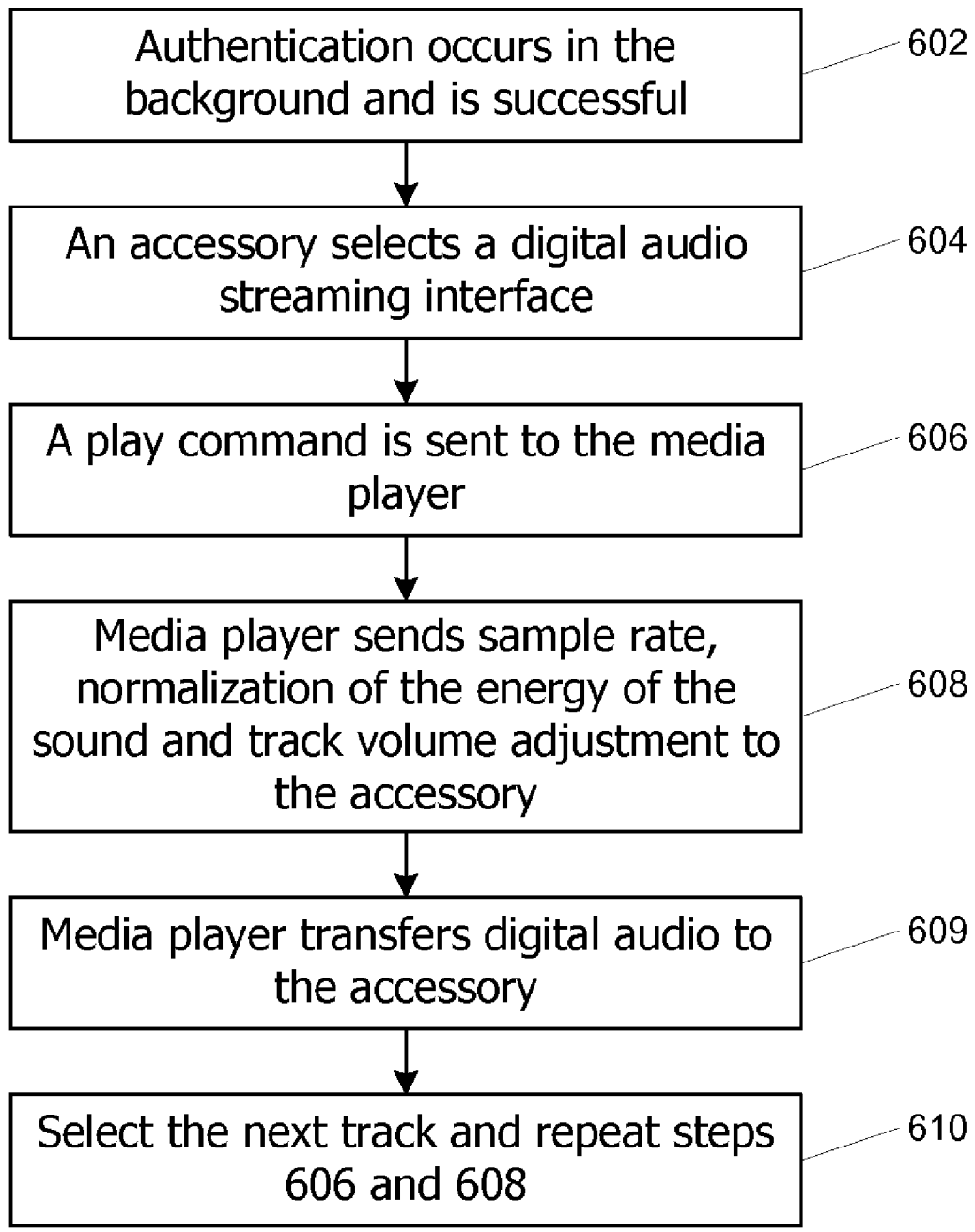
FIG. 6 is a flow chart illustrating how a media player provides digital audio to an accessory.

FIG. 6 is a flow chart illustrating the process by which a media player provides a digital audio signal to an accessory. First, authentication occurs in the background and is successful, via step 602. Next, the accessory selects a digital audio streaming interface for streaming the digital audio, via step 604. Then, a play command is sent to the media player, via step 606. Next, the media player sends a sample rate, a normalization of the audio tracks, and a track volume adjustment to the accessory, via step 608. The media player transfers digital audio to the accessory through the selected audio streaming interface via step 609. Thereafter, a next track is selected and steps 606 and 608 are repeated, via step 610.

To describe this process in more detail refer now to the following description in conjunction with the accompanying information. The steps shown hereinbelow illustrate enabling and disabling digital audio by the media player over a USB interface of the connector interface system 100.

1. Connect the media player to an accessory.

2. Select a media player configuration that has a USB Audio interface.

3. Identify the supported commands and authenticate the accessory. The media player requests from the accessory the list of sample rates it supports. The sample rates must be taken from the list of media player supported sample rates (for example as shown in FIG. 7).

4. Successfully respond to a command that requests the list of sample rates supported by the accessory. The sample rate sent to the accessory will be taken from the list of sample rates returned to the media player. If the accessory supports the sample rate of the current audio track, then it will be sent as the current sample rate. If the accessory does not support the sample rate, the media player will resample the audio data to a supported sample rate in real-time and will send this new supported sample rate as the current sample rate.

5. Enable the appropriate streaming interface on the media player.

6. Enter a mode to allow for the media player to provide digital audio.

7. Place the media player in the play state.

8. Accessory receives a sample rate, normalization of the energy of the sound and track volume adjustment from the media player.

9. Configure the accessory to the media player information of step 8 above.

10. Transfer digital audio from the media player to the accessory through the selected digital interface.

In one embodiment, digital audio is disabled when the USB connection between the media player and the accessory is lost. The accessory can also disable digital audio by selecting a zero bandwidth USB audio streaming interface on the media player.

To re-enable digital audio after the accessory has disabled it, steps 5-10 are repeated.

If the accessory requests digital audio data before digital audio is enabled or before the correct digital sample rate has been negotiated, the media player will return packets filled with zeros. The media player will also return packets filled with zeros if authentication fails.

A method and system in accordance with the present invention provides a plurality of commands that allow a media player to provide digital audio to an accessory. In so doing, an accessory can play digital audio media from the media player.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. It should be also understood that although the present invention was disclosed in the context of a wired USB streaming environment, the present invention could be utilized in any wired or wireless environment and that use would be within the spirit and scope of the present invention. Accordingly, many modifications may be made by one of ordinary skill in the art without departing from the spirit and scope of the appended claims.

What is claimed is:

1. A method for transferring digital audio data from a media player to an accessory, the method comprising, by the accessory:

sending to the media player a list of sample rates supported by the accessory;

receiving from the media player track information including a first sample rate for a first track, wherein the first sample rate is selected by the media player and is one of the sample rates on the list of sample rates supported by the accessory;

configuring a digital audio interface of the accessory according to the first sample rate; and receiving digital audio samples of the first track from the media player at the first sample rate via the digital audio interface.

2. The method of claim 1 further comprising:

authenticating the accessory to the media player prior to sending the list of supported sample rates to the media player.

3. The method of claim 1 wherein the track information received from the media player further includes a normalization of sound energy and a track volume adjustment.

4. The method of claim 1 further comprising:

receiving from the media player additional track information including a second sample rate for a second track of digital audio data, wherein the second sample rate is selected by the media player and is one of the sample rates on the list of sample rates supported by the accessory; and receiving the second track from the media player at the second sample rate via the digital audio interface.

5. The method of claim 4 further comprising:

in the event that the second sample rate is different from the first sample rate, reconfiguring the digital audio interface of the accessory according to the second sample rate.

6. The method of claim 1 further comprising:

receiving a request from the media player for the list of sample rates supported by the accessory, wherein the act of sending the list is performed in response to receiving the request.

7. A method for transferring digital audio data from a media player to an accessory, the method comprising, by the media player:

requesting from the accessory a list of sample rates supported by the accessory;

receiving from the accessory the list of sample rates supported by the accessory;

selecting from the list of sample rates supported by the accessory a first sample rate to be used for a playing a first track of digital audio data;

sending track information including the first sample rate to the accessory; and sending digital audio samples of the first track via a digital audio interface to the accessory at the first sample rate.

8. The method of claim 7 further comprising:

performing an authentication operation to determine whether the accessory is authenticated; and disabling the digital audio interface in the event that the accessory is not authenticated.

9. The method of claim 7 wherein the track information sent by the media player further includes a normalization of the sound energy and a track volume adjustment.

10. The method of claim 7 further comprising:

disabling the digital audio interface in the event that the accessory becomes disconnected from the media player.

11. The method of claim 7 further comprising:

determining a stored sample rate with which the first track is stored in the media player, wherein selecting the first sample rate includes:

in the event that the stored sample rate matches one of the sample rates on the list of sample rates supported by the accessory, selecting the stored sample rate as the first sample rate; and in the event that the stored sample rate does not match any of the sample rates on the list of sample rates supported by the accessory, selecting one of the sample rates on the list of sample rates supported by the accessory as the first sample rate.

12. The method of claim 7 wherein sending the first track to the accessory includes:

in the event that the first sample rate does not match a stored sample rate with which the first track is stored in the media player, converting the first track of digital audio data to the first sample rate, wherein the converted first track of digital audio data is sent to the accessory.

13. The method of claim 7 further comprising:

selecting from the list of sample rates supported by the accessory a second sample rate to be used for a playing a second track of digital audio data;

sending to the accessory additional track information including the second sample rate; and sending the second track to the accessory at the second sample rate via the digital audio interface.

14. The method of claim 13 wherein sending the second track to the accessory includes:

in the event that the second sample rate does not match a stored sample rate with which the second track is stored in the media player, converting the second track of digital audio data to the second sample rate, wherein the converted second track of digital audio data is sent to the accessory.

15. An accessory for use with a media player, the accessory comprising:

a digital audio interface configured to receive digital audio samples of a track of digital audio data from the media player;

a playback unit configured to play a track of digital audio data received via the digital audio interface; and a command interface configured to communicate with the media player using a plurality of commands, the plurality of commands including:

a first command sendable by the accessory to the media player, the first command providing to the media player a list of sample rates supported by the accessory; and a second command receivable by the accessory from the media player, the second command providing to the accessory track information for a track of digital audio data, the track information including a sample rate for the track, the sample rate for the track being selected by the media player from the list of sample rates supported by the accessory.

16. The accessory of claim 15 wherein the plurality of commands further includes:

a third command receivable by the accessory from the media player, the third command requesting the list of sample rates supported by the accessory.

17. The accessory of claim 15 wherein the track information provided by the second command further includes a normalization of sound energy and a track volume adjustment.

18. The accessory of claim 15 wherein the digital audio interface includes a wireless interface.

19. The accessory of claim 15 wherein the digital audio interface includes a connector having a plurality of signal contacts.

20. The accessory of claim 15 wherein the digital audio interface includes a Universal Serial Bus ("USB") audio interface.

21. A media player for use with an accessory, the media player comprising:

a digital audio interface configured to send digital audio samples of a track of digital audio data to the accessory;

a storage device configured to store a plurality of tracks of digital audio data;

a playback engine configured to select a sample rate for one of the stored tracks of digital audio data and to deliver the one of the stored tracks to the digital audio interface at the selected sample rate; and a command interface configured to communicate with the accessory using a plurality of commands, the plurality of commands including:

a first command receivable by the media player from the accessory, the first command providing to the media player a list of sample rates supported by the accessory; and a second command sendable by the media player to the accessory, the second command providing to the accessory track information for a track of digital audio data to be sent to the accessory, the track information including the sample rate selected by the playback engine for the track, wherein the selected sample rate is one of the sample rates on the list of sample rates supported by the accessory.

22. The media player of claim 21 wherein the plurality of commands further includes:

a third command sendable by the media player to the accessory, the third command requesting the list of sample rates supported by the accessory.

23. The media player of claim 21 wherein the track information provided by the second command further includes a normalization parameter and a track volume adjustment parameter.

24. The media player of claim 21 wherein the digital audio interface includes a wireless interface.

25. The media player of claim 21 wherein the digital audio interface includes a connector having a plurality of signal contacts.

26. The media player of claim 21 wherein the digital audio interface includes a Universal Serial Bus ("USB") audio interface.

27. The media player of claim 21 wherein the playback engine is further configured to determine a stored sample rate with which the first track is stored in the media player and wherein the playback engine is further configured such that:

in the event that the stored sample rate matches one of the sample rates on the list of sample rates supported by the accessory, the stored sample rate is selected as the first sample rate; and in the event that the stored sample rate does not match any of the sample rates on the list of sample rates supported by the accessory, one of the sample rates on the list of sample rates supported by the accessory is selected as the first sample rate.

28. The media player of claim 21 wherein the playback engine is further configured such that in the event that the stored track has a sample rate different from the selected sample rate, the playback engine converts the track to the selected sample rate and delivers the converted track to the digital audio interface at the selected sample rate.

* * * * *

UNITED STATES PATENT AND TRADEMARK OFFICE
CERTIFICATE OF CORRECTION

| | |
|---|---|
| PATENT NO. | : 7,895,378 B2 |
| APPLICATION NO. | : 11/476312 |
| DATED | : February 22, 2011 |
| INVENTOR(S) | : Paul Holden et al. |

It is certified that error appears in the above-identified patent and that said Letters Patent is hereby corrected as shown below:

On Title page 4, Item (56) in column 2, under "Other Publications", line 4, delete "wysiwvcl:/" and insert -- wysiwyg:/ --, therefor.

On Title page 4, Item (56) in column 2, under "Other Publications", line 11, delete "httml." and insert -- html. --, therefor.

On Title page 4, Item (56) in column 2, under "Other Publications", line 34, delete "Colloquim" and insert -- Colloquium --, therefor.

On Title page 5, Item (56) in column 1, under "Other Publications", line 7, delete "Pbulished" and insert -- Published --, therefor.

On Title page 5, Item (56) in column 2, under "Other Publications", line 10, delete "Implemeation" and insert -- Implementation --, therefor.

On Title page 5, Item (56) in column 2, under "Other Publications", line 12, delete "Electonics," and insert -- Electronics, --, therefor.

On Title page 5, Item (56) in column 2, under "Other Publications", line 12, delete "(ISCE" and insert -- (ICSE --, therefor.

On Title page 5, Item (56) in column 2, under "Other Publications", line 17, delete "Forencically" and insert -- Forensically --, therefor.

On Title page 5, Item (56) in column 2, under "Other Publications", line 19, delete "Internation" and insert -- International --, therefor.

On sheet 3 of 12, in Figure 3A, After Audio return-, line 33, delete "Singal," and insert -- Signal, --, therefor.

Signed and Sealed this
Eighth Day of November, 2011

David J. Kappos
*Director of the United States Patent and Trademark Office*

CERTIFICATE OF CORRECTION (continued)
U.S. Pat. No. 7,895,378 B2

On sheet 4 of 12, in Figure 3B, After Audio, line 5, delete "teturn" and insert -- return --, therefor.

In column 1, line 9, delete "device." and insert -- devices. --, therefor.

In column 2, line 67, delete "1 A," and insert -- 1A, --, therefor.